United States Patent [19]
Ohori

[11] Patent Number: 5,677,770
[45] Date of Patent: Oct. 14, 1997

[54] IMAGE FORMING APPARATUS FOR PRINTING ADDITIONAL DATA SUCH AS IMAGE FORMING CONDITION DATA ALONG WITH THE IMAGE

[75] Inventor: Akira Ohori, Yokohama, Japan

[73] Assignee: Ricoh Company, Ltd., Tokyo, Japan

[21] Appl. No.: 272,744

[22] Filed: Jul. 11, 1994

[30] Foreign Application Priority Data

Jul. 29, 1993 [JP] Japan ................... 5-188509

[51] Int. Cl.$^6$ .................. H04N 1/387; H04N 1/46; G03B 27/52; G06K 7/10
[52] U.S. Cl. .............. 358/296; 358/401; 358/406; 358/434; 358/450; 358/501; 358/504; 355/40; 235/462
[58] Field of Search .................. 358/296, 298, 358/300, 302, 401, 406, 434, 440, 447, 448, 450, 452, 501, 504, 537, 540; 355/203, 204, 208, 209, 40; 235/462, 463; 399/81, 83, 9, 364

[56] References Cited

U.S. PATENT DOCUMENTS

| | | | |
|---|---|---|---|
| 4,637,707 | 1/1987 | Kasahara et al. | 355/77 X |
| 4,912,503 | 3/1990 | Sawaki et al. | 355/40 |
| 5,008,704 | 4/1991 | Watanabe et al. | 355/203 X |
| 5,140,442 | 8/1992 | Shigemura | 358/401 X |
| 5,164,574 | 11/1992 | Ujiie et al. | 235/462 |

*Primary Examiner*—Eric Frahm
*Attorney, Agent, or Firm*—Lowe, Price, LeBlanc & Becker

[57] ABSTRACT

An image forming apparatus has an operating panel to input various image-forming conditions, an image processing member for processing an input image signal, an outputting member for outputting an image, and a controller. The controller controls the operating panel, the image processing member and the outputting member so as to print the image forming conditions themselves as part of an image on a piece of paper.

14 Claims, 10 Drawing Sheets

```
DATE         : 1993.03.31
TIME         : 17:00
YELLOW       : 80
MAGENTA      : 110
CYAN         : 90
COPIED NUMBER: 1/1
WIDTH        : 100
LENGTH       : 100
               .
               .
               .
               .
```

IMAGE FORMING APPARATUS FOR PRINTING ADDITIONAL DATA SUCH AS IMAGE FORMING CONDITION DATA ALONG WITH THE IMAGE

BACKGROUND OF THE INVENTION

1. Field of the Invention

This invention relates to an image forming apparatus capable of setting various image forming conditions, thereby converting image signals which are read by an image scanner into desired image signals, and forming a resulting image along with an image representing the image forming conditions themselves.

2. Related Art

When an operator wants to form a desired image, the operator sets various image forming conditions using an image forming apparatus. The image forming conditions include, for example, information to discriminate a photograph or a drawing picture, density information, magnification information and density information of each color in a color image forming apparatus.

In conventional image forming apparatus, it is difficult to set the same image forming conditions when the previous image forming conditions have been reset after a desired image has been formed.

SUMMARY OF THE INVENTION

The present invention has an object to overcome the above and other problems encountered in the aforementioned art.

It is a further object of the present invention to provide an image forming apparatus capable of easily setting the same image forming conditions as previously-set image forming conditions.

It is another object of the invention to provide an image forming apparatus capable of reliably getting information of the previously-set image forming conditions.

The above mentioned objects of the present invention are achieved by an image forming apparatus which forms an input image on a paper sheet.

The image forming apparatus which forms an input image on a paper sheet includes an operating panel to set parameters for forming a desired image, a signal processor for converting input image data into desired image data in response to the parameters, an output device for outputting an image containing the parameters on a paper sheet, and a control portion for controlling the operating panel, signal processor, and output portion.

BRIEF DESCRIPTION OF THE DRAWINGS

Other objects and further features of the present invention will become apparent from the following detailed description when read in conjunction with the accompanying drawings, wherein.

DETAILED DESCRIPTION OF THE PREFERRED EMBODIMENTS

Figure 1:
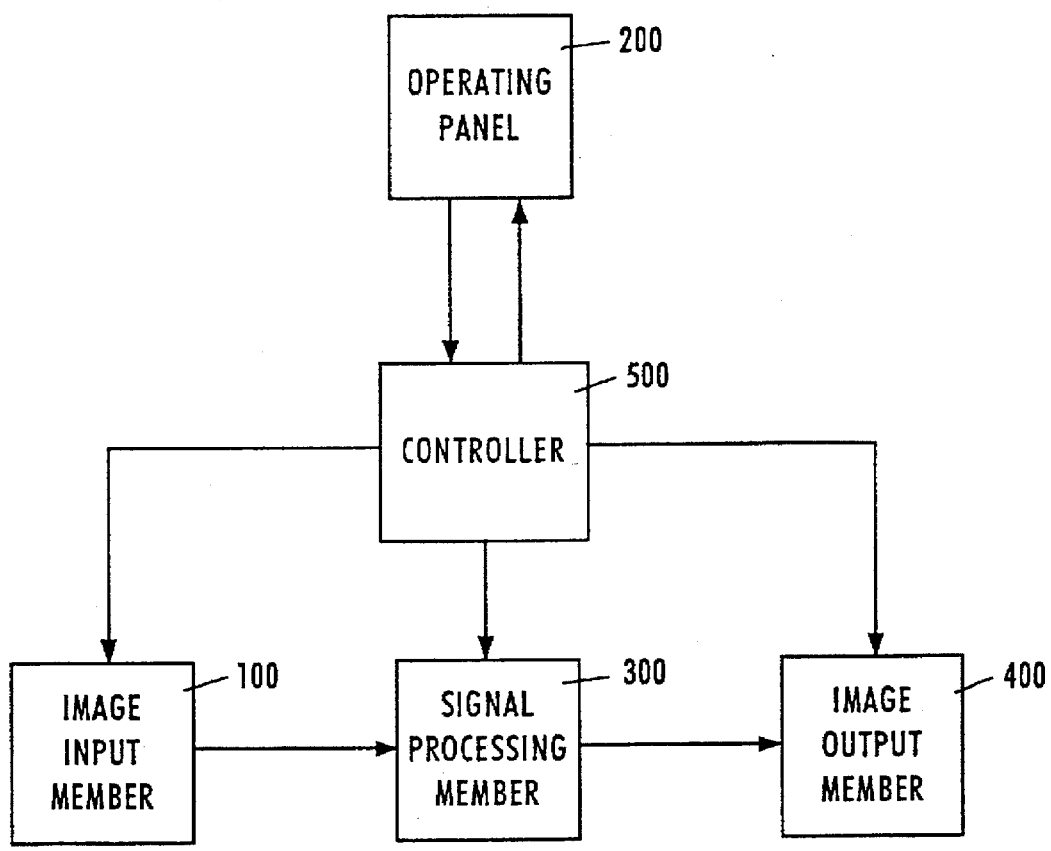
FIG. 1 is a block diagram showing a structure of a first embodiment according to the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

A description will now be given of preferred embodiments, taking a digital copier as an example.

Hereinafter, the same structures are represented by the same reference numerals throughout.

Referring to FIG. 1, an image input member 100 includes a scanner which scans a document and a color charge coupled device (hereinafter referring as a color CCD) in which the scanned image light is converted into electrical signals, and Red (R), Green (G) and Blue (B) signals are output.

On an operating panel 200 are disposed keys for discrimination of photograph or drawing picture, copying density of Yellow (Y), Magenta (M) and Cyan (C), copying magnification, a copying number and indication of copying start, etc. An operator sets such parameters or image forming conditions, or makes various indications, by touching the keys.

In response to parameters (image forming conditions) which are input from the operating panel 200, a signal processing member 300 converts R, G and B data which are input from the image input member 100 into Y, M and C image data. The signal processing member 100 carries out various conversions or processes, such as 7 conversion, color compensating conversion, magnification conversion and filter processing.

An image output member 400 forms an image on a paper sheet which is fed from a paper feeding member (not shown), based on the image data. When input image data are color, each color image is formed on a paper sheet, and thereby, a color image is formed. The image output member 400 can be a thermal transfer type, an electrophotographic type or an ink jet type.

A controller 500 has a read only memory (ROM) which includes programs controlling the image input member 100, the operating panel 200, the signal processing member 300 and the image output member 400. Further, in the ROM are recorded initial values of image forming conditions or various data. The controller 500 also includes a random access memory (RAM) in which data occurring during operation of the program are recorded temporarily, and a central processing unit (CPU) which operates or processes according to the program recorded in the ROM and sends commands or data to the members 100, 200, 300 and 400.

The CPU outputs set values of image forming conditions as parameters to the signal processing member 300 when the set values for conversions or new operations (such as data of a γ conversion table, a color compensating coefficient, data of magnification conversion, filter processing coefficient, etc.) are set from the operating panel 200 to get a desired image before the copying operation starts. When any value is not set by the operator, the CPU outputs initial values which were recorded in the ROM as parameters to the signal processing member 300.

Figure 2:
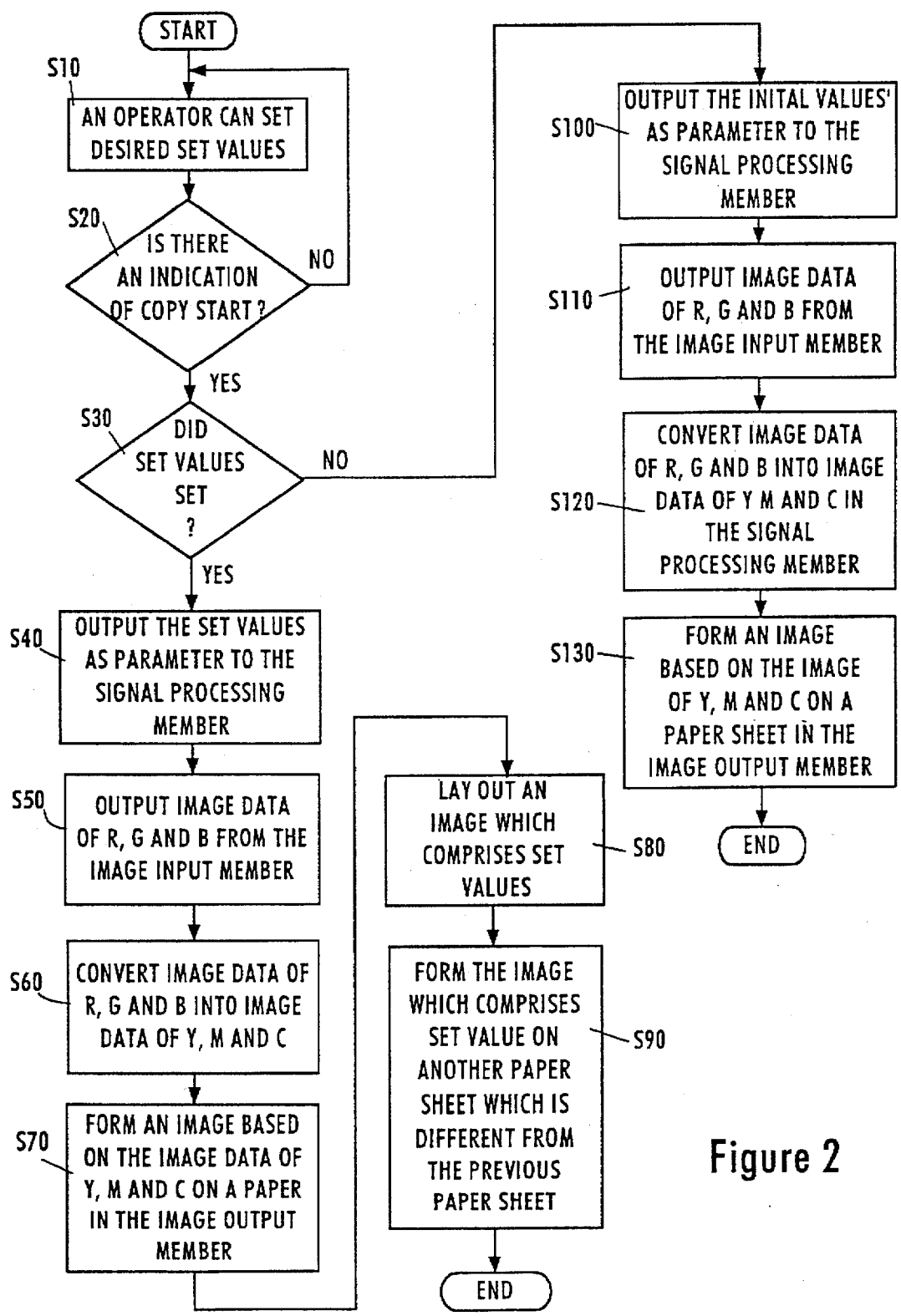
FIG. 2 is a flow chart showing operation of the first embodiment according to the present invention.

Referring to a flow chart of FIG. 2, a description will be given of operation according to the first embodiment.

Until an operator initiates a copying operation, the operating panel 200 is in a state 50 that desired image forming conditions can be input, so that an operator can set various image forming conditions to obtain a desired image (in step 10). When the indication of the copying operation is detected (in step 20), the controller 500 determines whether set values (image forming conditions) are set from the operating panel 200 (in step 30). When the set values have been input, the CPU outputs the set values (image forming conditions) as parameters to the signal processing member 300 and sends commands or data to the members 100, 200, 300 and 400 (in step 40). When the image input member 100 receives the commands, the image input member 100 scans and reads a set document and then outputs image data of R, G and B (in step 50). The image data of R, G and B are converted into image data of Y, M and C in response to the input image forming conditions (parameters) in the signal processing member 300 and various processes or conversions are carried out to get the desired image (in step 60). An image is formed on a first paper sheet in the image output member 400 based on the image data to which the processes or conversions have been carried out (in step 70). The various set values which are set in the operating panel 200 are laid out in a form which is recorded previously in the ROM as image data shown in FIG. 3 (in step 80). The laid out image data which include the set values are input to the image output member 400. An image based on the image data of the set values themselves is formed on a second paper sheet different from the first paper sheet on which is formed the image of Y, M and C (in step 90).

When any set value is not set afresh in step 30, the controller 500 outputs the recorded initial values as parameters to the signal processing member 300 and sends commands or data to the members 100, 200, 300 and 400 (in step 100). When the image input member 100 receives the commands, the image input member 100 scans and reads a set document and outputs image data of R, G and B (in step 110). The image data of R, G and B are converted into image data of Y, M and C in response to the input image forming conditions (parameters) in the signal processing member 300 and various conversions or processes are carried out to the data of Y, M and C (in step 120). An image is formed on a paper sheet in the image output member 400 based on the image data of Y, M and C to which the conversion or processes have been carried out (in step 130).

Since an image is formed on a first paper sheet when set values are set based on image signals which are output from the image processing member, and an image is formed on a second paper sheet based on image signals which include set values (image forming conditions), it becomes easy to set the same image forming conditions as the previously-set ones.

Figures 3, 4:
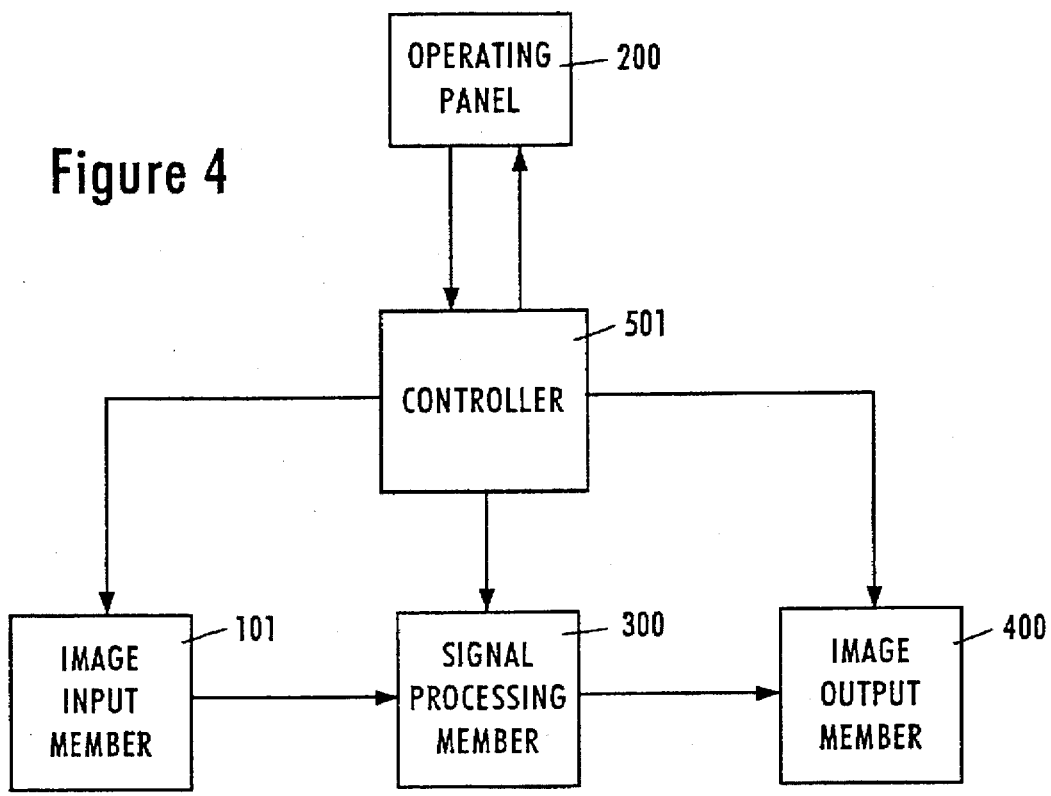
FIG. 3 is a diagram showing a recorded image of the first embodiment according to the present invention.
FIG. 4 is a block diagram showing a structure of a second embodiment according to the present invention.
Figure 5:
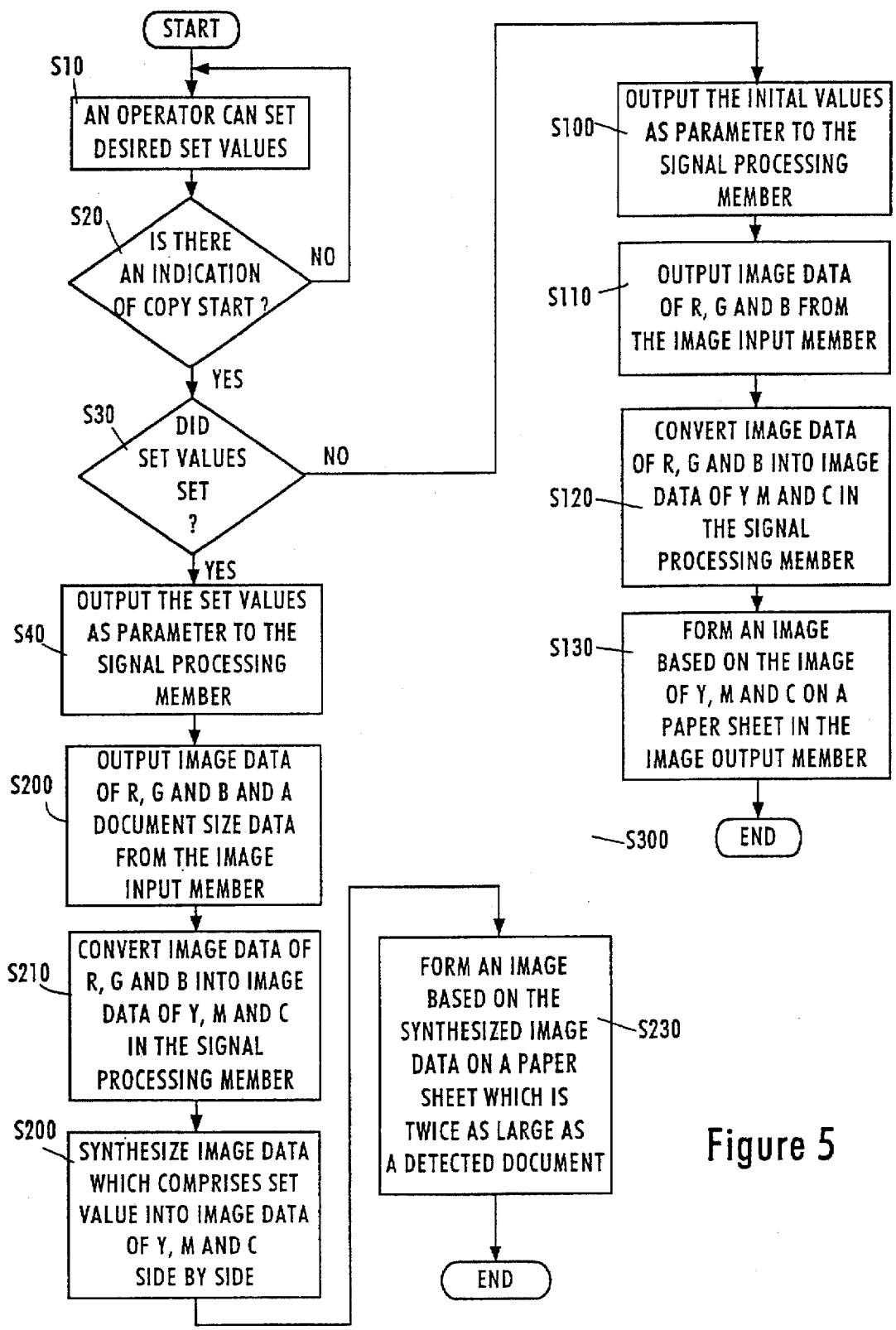
FIG. 5 is a flow chart showing operation of the second embodiment according to the present invention.
Figure 6:
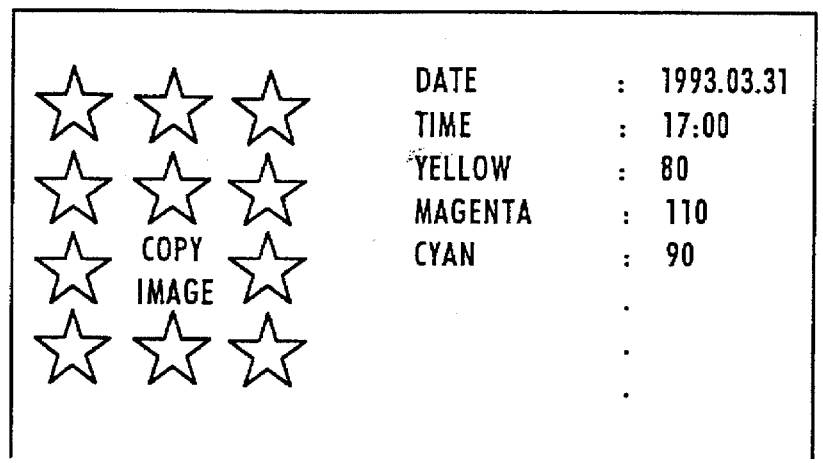
FIG. 6 is a diagram showing a recorded image of the second embodiment according to the present invention.

Next, description will be now given of a second embodiment, referring to FIGS. 4 to 6.

First, an entire structure will be explained referring to FIG. 4.

The operating panel 200, the signal processing member 300 and the image output member 400 are the same as those of the first embodiment. However, a image input member 101 and a controller 501 are different from the input member 100 and the controller 500 of the first embodiment.

In addition to the structure of the image input member 100 of first embodiment, the image input member 101 is constructed so as to detect a document size when a document is scanned.

Further, control of the controller 501 is different from that of the controller 500 of the first embodiment.

Next, description will be given of operation of the second embodiment referring to a flow chart of FIG. 5.

Since the steps 10 to 40 and 100 to 130 are the same as those of the first embodiment, their explanations are not repeated.

When the image input member 101 receives the commands, the image input member 101 scans and reads a set document and outputs image data of R, G and B and then detects a size of the document and outputs data of the size (in step 200). The image data of R, G and B are converted into image data of Y, M and C in response to the input image forming conditions (parameters) in the signal processing member 300 and various conversions or processes are carried out at that time (in step 210). The image data of Y, M and C to which the conversions or processes have been carried out, and the set value image data which have been set in the operating panel 200 are synthesized side by side, as shown in FIG. 6 (in step 220). A paper sheet, which is twice as large as the paper sheet which is detected previously, is fed. The image output member 400 produces the synthesized image on the fed paper sheet (in step 230).

When the amount of image data which include the set values is small, a paper sheet which is twice as large as a detected document size is not always needed. The paper sheet to be fed may be at least larger than the size of the detected document.

When no set value has been set by the operator, a paper sheet of almost the same size as the detected document size is fed, on which an image is formed.

Since a paper sheet of a larger size than a detected document size is fed, and an image based on image data which is output from the signal processing member 300 and an image of image forming conditions (parameters) are synthesized and output on the paper sheet, it is easy to get information of the previously-set image forming conditions and reproduce the previously-set same image forming conditions.

A description will be given of a third embodiment, referring to FIG. 7 and 8.

Figure 7:
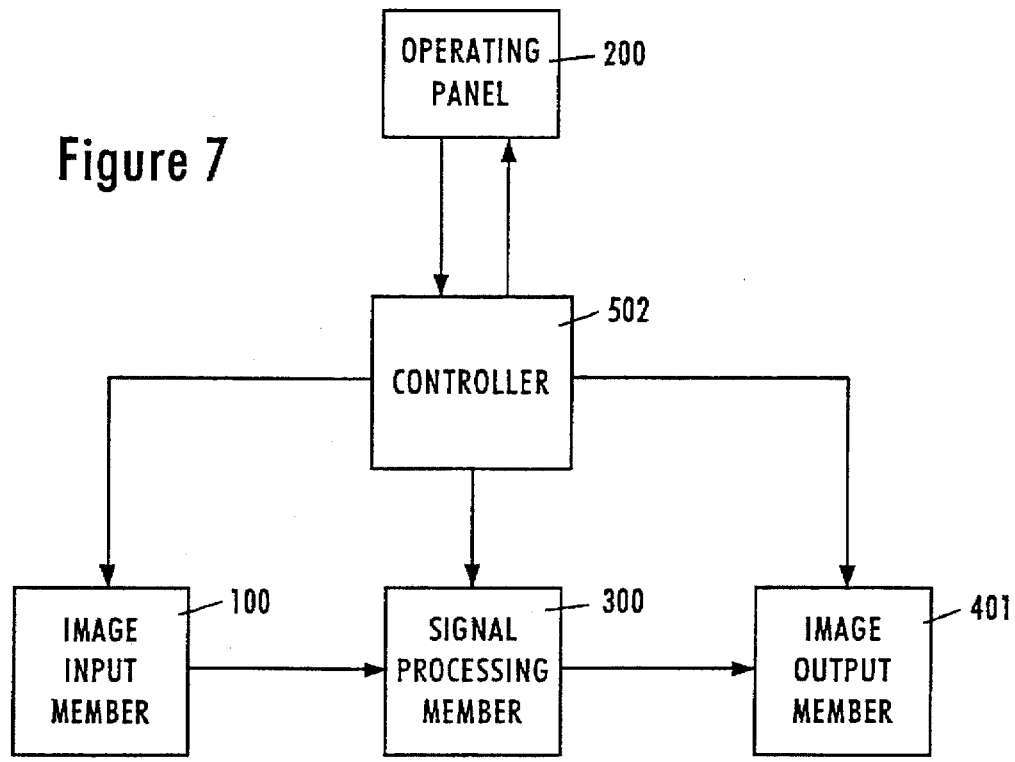
FIG. 7 is a block diagram showing a structure of a third embodiment according to the present invention.
Figure 8:
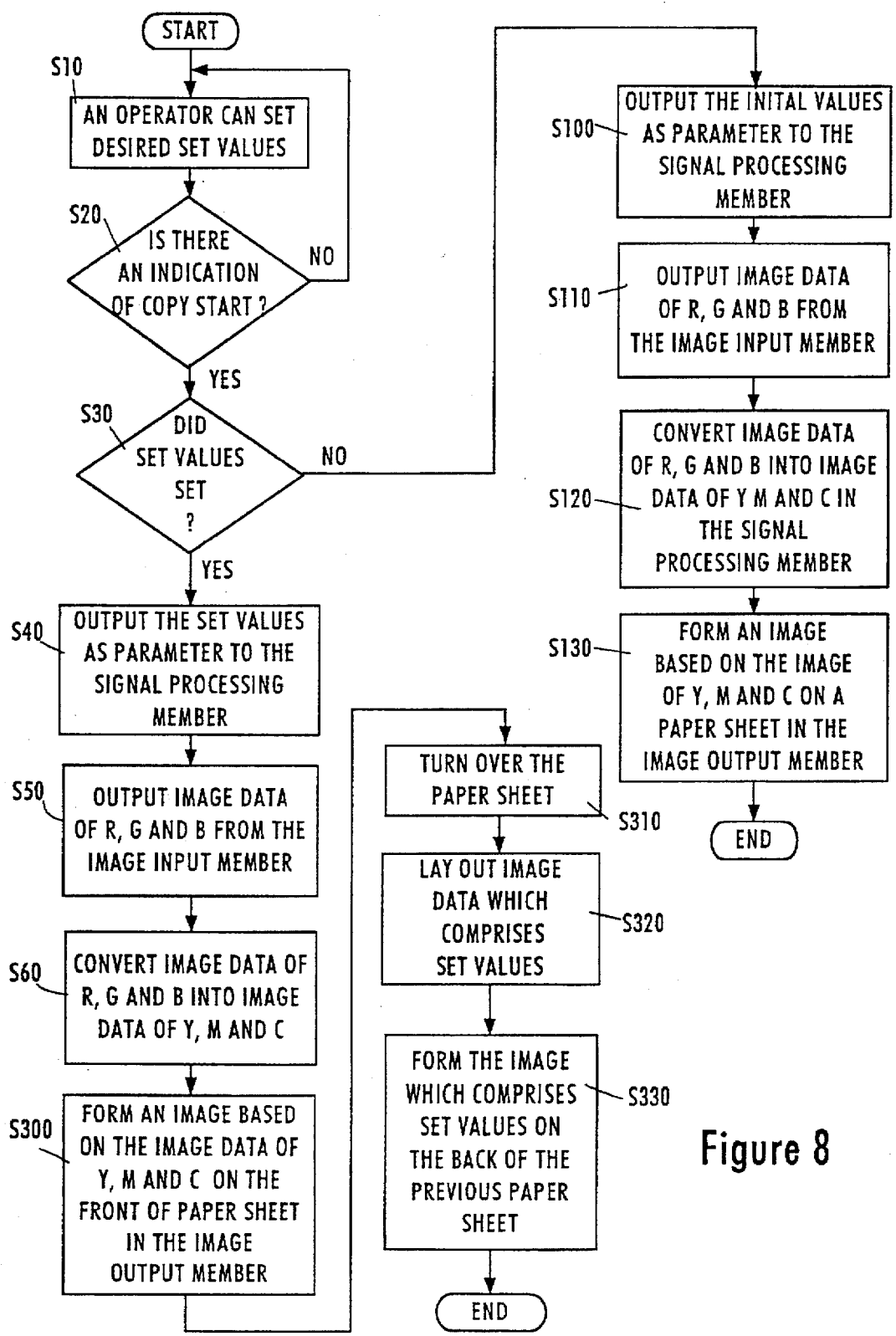
FIG. 8 is a flow chart showing operation of the third embodiment according to the present invention.

In FIG. 7, the image input member 100, the operating panel 200 and the signal processing member 300 are the same as those of the first embodiment, but an image output member 401 and a controller 502 are different from the image output member 400 and the controller 500 of the first embodiment.

In addition to the structure of the image output member 400 of the first embodiment, the image output member 401 has a function by which a paper sheet is turned over and an image is formed on the back of the paper sheet after an image is formed on the front face.

Control of the controller 502 is different from the controller 500 of the first embodiment.

The operation of the FIG. 7 embodiment will be explained, referring to a flow chart of FIG. 8.

Since the steps 10 to 60 and 100 to 130 are the same as those of the flow chart of the first embodiment, their explanations are not repeated.

The image output member 401 forms an image, based on an image data of Y, M and C, on a front of a fed paper sheet (in step 300). The paper sheet on which the image is formed is turned over (in step 310). The image data which include set values are laid out (in step 320). The image output member 401 forms an image, based on the image data of the set values, on the back of the turned-over paper sheet (in step 330).

If value of image forming conditions have been set, since an image is formed on a front of a paper sheet based on an image data which is output from the signal processing member 300, and further an image which includes set values of image forming conditions are formed on the back of the paper sheet, it is possible to easily and reliably obtain information of the set values and to easily reproduce the same image forming conditions as the previously-set ones.

Figure 9:
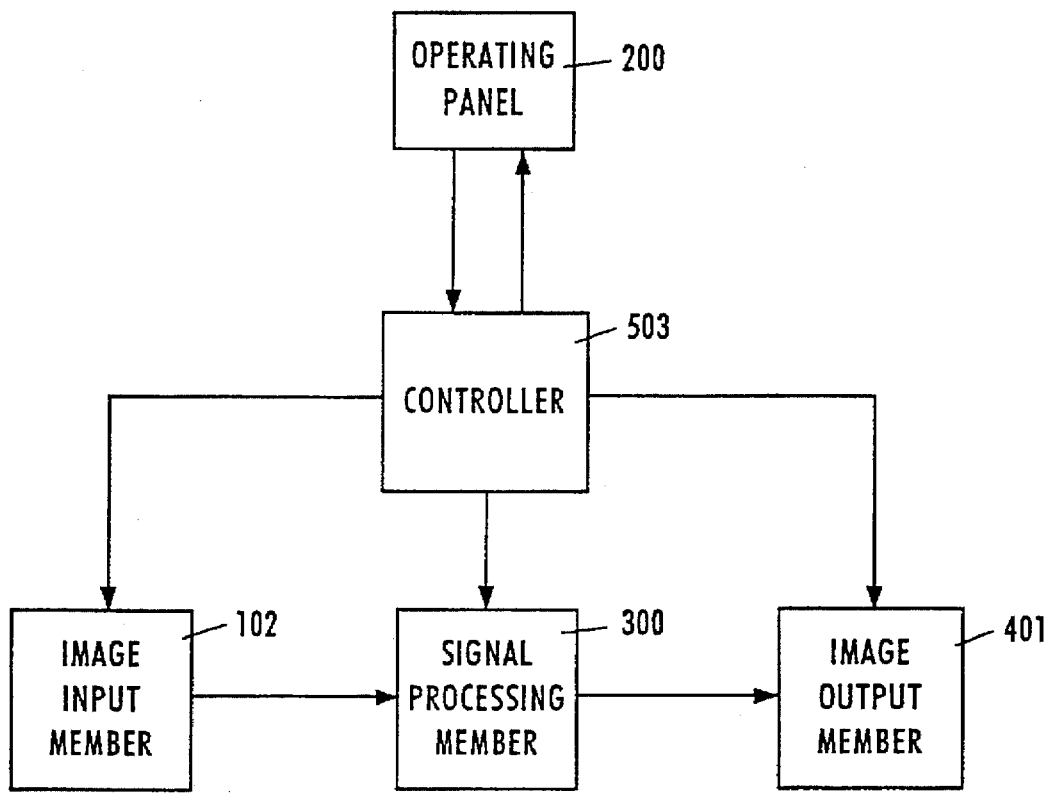
FIG. 9 is a block diagram showing a structure of a fourth embodiment according to the present invention.
Figure 10:
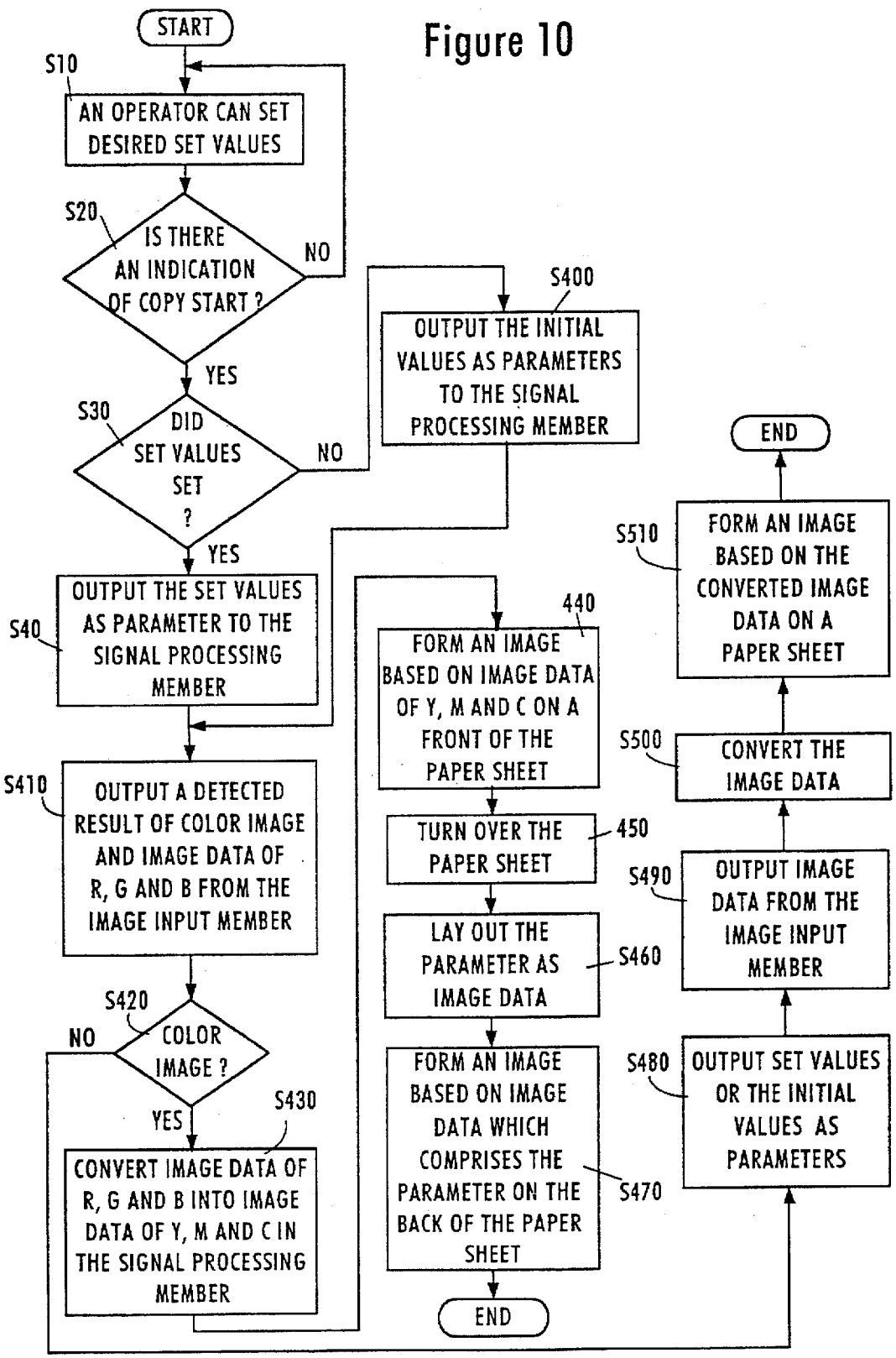
FIG. 10 is a flow chart showing operation of the fourth embodiment according to the present invention.

Further, a fourth embodiment will be explained, referring to FIG. 9 and 10.

An entire structure will be explained using FIG. 9.

Since the operating panel 200 and the signal processing member 300 are the same as those of the first embodiment, their explanation is not repeated. However, an image input member 102, an image output member 401 and a controller 503 are different from the members 100, 400 and 500 of the first embodiment.

First, in addition to the structure of the image input member 100, the image input member 102 is constructed so as to be able to detect whether a set document image contains only black, or color, when the document is scanned. The image output member 401 is the same as that of the third embodiment and the controller 503 is different from the controller 500 of the first embodiment in view of control.

Next, the operation of the fourth embodiment will be given, referring to a flow chart of FIG. 10.

Since the steps 10 to 40 are the same as those of the first embodiment, their explanation is not repeated.

In step 400, when no set value has been set by the operator, the recorded initial values are output as parameters to the signal processing member 300. When the image input member 102 receives the commands, the image input member 103 scans and reads a set document. The image input member 102 outputs image data of R, G and B and further detects whether color is included on a document image, and outputs the detected signals (in step 410). Whether color is contained in 15 an image of the document is determined according to the detected signals (in step 420). When a color image is present, the image data of R, G and B are converted into image data of Y, M and C in response to the image forming conditions (parameters) in the signal processing member 300 and various conversions or processes are carried out (in step 430). The image output member 401 forms an image, based on image data of Y, M and C, on a front of a fed paper sheet (in step 440). The paper sheet on which the image is formed is turned over (in step 450). Image data which include the image forming conditions (parameters) are laid out (in step 460). The image output member 401 forms an image, based on the image data of the parameter, on the back of paper sheet (in step 470).

In the step 420, when there is not any color in the image (except for a black image) on the document, the controller 502 outputs the set values or the initial values as parameters to the signal processing member 300 and sends commands or data to the members 102, 200, 300, 401 (in step 480). When the image input member 102 receives the commands, the image input member 102 scans and reads the set document and then outputs image data (in step 490). The image data are converted into image data to be formed on a paper sheet in response to the input image forming conditions (parameters) in the signal processing member 300 and various conversions or processes are carried out (in step 500). Based on the image data on which are carried out the various conversions or processes, an image is formed on a paper sheet in the image output member 401 (in step 510).

If color signals are contained in image signals, an image is formed on a front of paper sheet based on image signals which are output from the signal processing member 300, and further, an image is formed on the back of the paper sheet based on image signals which include the set values themselves. Thereby, it is easy to reproduce the same image forming conditions as the previously-set ones. That is, since it is expected that a complicated set of image forming conditions is needed to output a color recording, it is easy to reproduce the complicated set values by looking at the set values on the back.

Figure 11:
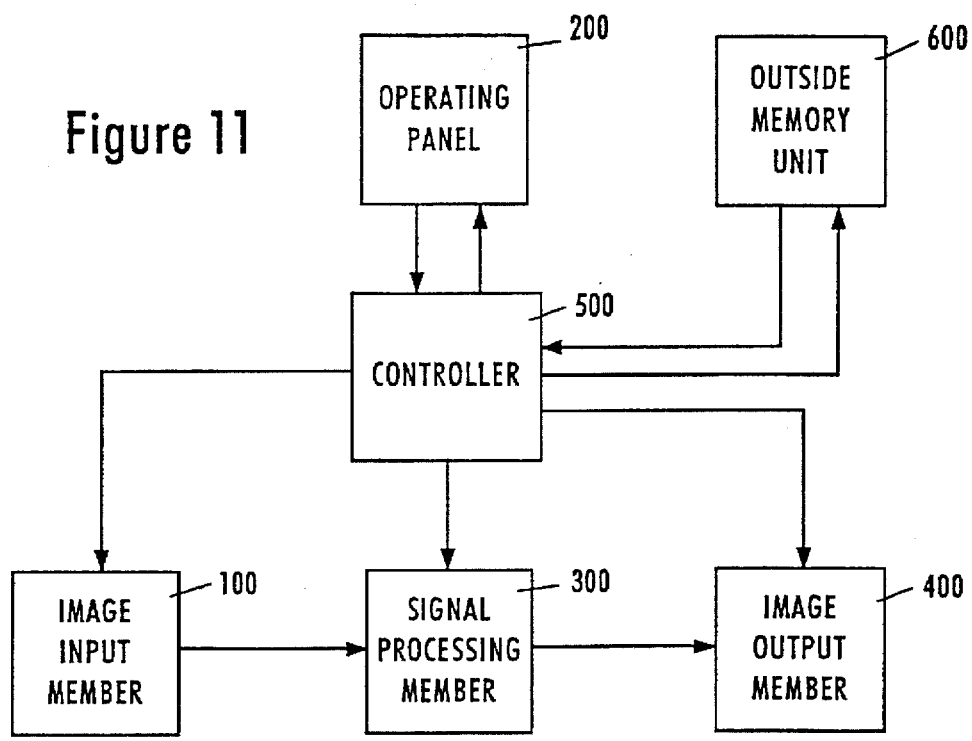
FIG. 11 is a block diagramn showing a structure of a fifth embodiment according to the present invention.

Further, a fifth embodiment will be explained, referring to FIG. 11.

In the fifth embodiment, in addition to the structures of the first embodiment, an outside memoryunit 600 is provided.

The controller 500 counts copies and keeps a "copied number" in a memory, and synthesizes an image of copied number data into an image which is read by the image input member 100 and processed by the signal processing member 300. The controller 500 then outputs the synthesized image to the image output member 400. The synthesized copied number image is laid out on a margin of the paper sheet. Simultaneously, the controller 500 records set values of image forming conditions which are set at that time, and data of environment conditions corresponding to the copied number.

The copied number data and the set values which correspond to the copied number are recorded in the outside memory unit 600, and the copied number data and the set values data are read out from the outside memory unit 600 by the controller 500 based on an input from the operating panel 200. The data are output to the image output member 400, and thereby, the image is made ready for output.

Figure 12:
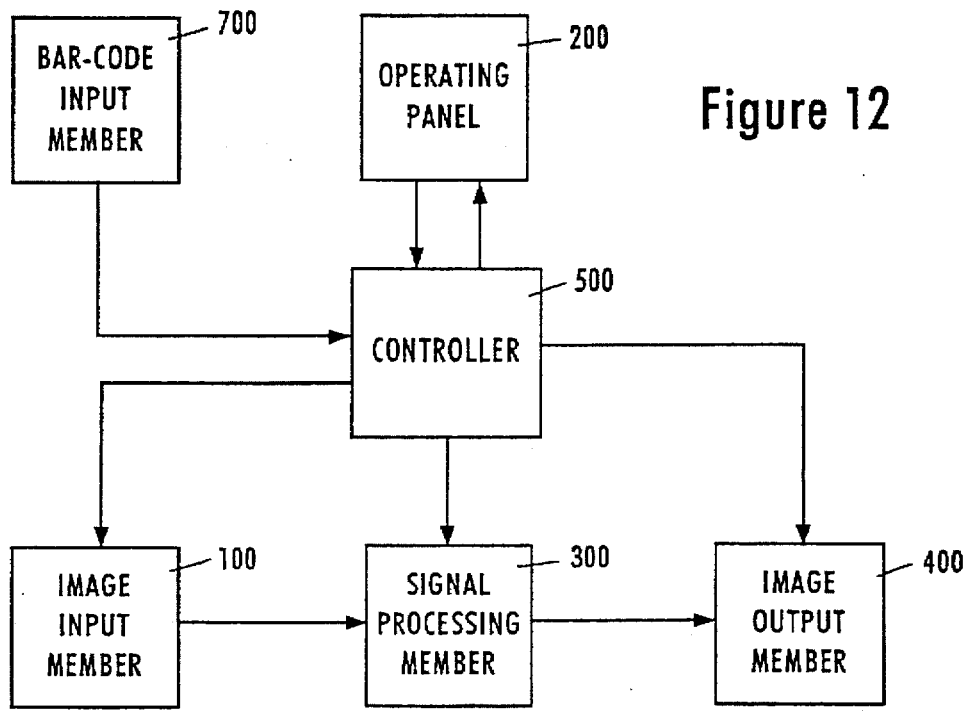
FIG. 12 is a block diagram showing a block diagram of a sixth embodiment according to the present invention.
Figure 13:
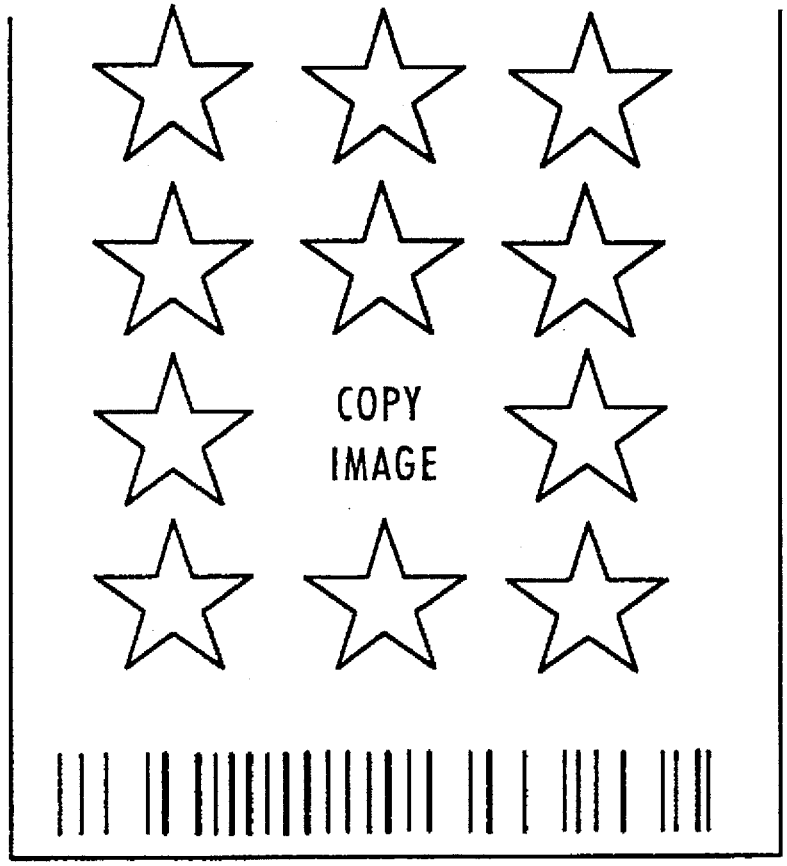
FIGS. 13 is a diagram showing a recorded image of the sixth embodiment according to the present invention.

A description will be given of a sixth embodiment, referring to FIG. 12 and 13.

In the sixth embodiment, in addition to the structures of the first embodiment, a bar-code input member 700 is provided.

The controller 500 converts various set values and data of environment conditions into bar code data when the copy start key is pushed and the copying operation starts. The controller 500 synthesizes the bar code data into a margin (outside of the image area) of the image data which are read by the image input member 100 and processed by the signal processing member 300. The controller 500 sends the synthesized image data to the image output member 400. As shown in FIG. 13, the image output member 400 simultaneously forms the copy image and the bar code data image which shows the set values (the image forming conditions) on a paper sheet.

When the bar-code input member 700 reads the bar code data, the controller 500 converts the bar code data into data of the set values and automatically sets the set values of the image forming apparatus.

In the above exemplary explanation, all data of the set values or environment conditions are always output. But all or part of the set values (or environment conditions) can be selected by an operator as desired. Thus, it is contemplated to output all or part of the data.

Numerous modifications and variations of the present invention are possible in light of the above teachings. It is therefore to be understood that, within the scope of the appended claims and their equivalents, the invention may be practiced otherwise than as specifically described herein.

What is claimed is:

1. An image forming apparatus which forms an input image on a paper sheet, the apparatus comprising:
   an operating panel to set parameters for forming a desired image, wherein said parameters are image forming conditions;
   signal processing means for converting input image data into desired image data in response to said parameters;
   outputting means for outputting an image containing said parameters on the paper sheet;
   controlling means for controlling said operating panel, said signal processing means and said outputting means;
   a memory for storing initial values of image forming conditions; and
   determining means for determining whether image forming conditions are newly input from said operating panel;
   wherein the controlling means constitutes means for causing output of an image containing said initial values on the paper sheet, when said determining means determines that image forming conditions are not newly input.

2. An image forming apparatus according to claim 1, wherein:
   said controlling means constitutes means for causing output of (a) an input image on a paper sheet and (b) an image containing image forming conditions on another paper sheet.

3. An image forming apparatus according to claim 1, further comprising:
   synthesizing means for synthesizing (a) an image of image forming conditions with (b) an input image, to form a synthesized image;
   wherein said synthesized image is output on a single paper sheet.

4. An image forming apparatus according to claim 3, further comprising:
   a scanner to read an image of a document; and
   detecting means for detecting a size of the document;
   wherein said controlling means controls so as to feed a paper sheet which is larger than detected document size and form said synthesized image on said fed paper sheet.

5. An image forming apparatus according to claim 4, wherein said paper sheet is twice as large as said detected document and said synthesized image is obtained by synthesizing said image data and said set values side by side.

6. An image forming apparatus according to claim 1, wherein:
   said controlling means comprises a controller sending control commands to said operating panel and said parameters to said signal processing means;
   said apparatus further comprises an image input member outputting electrical signals representative of said input image data in response to control commands sent from said controller; and
   said signal processing means comprises a signal processing member receiving said control commands from said controller and said electrical signals from said image input member and outputting said desired image data to said outputting means.

7. An image forming apparatus according to claim 6, wherein the image input member outputs electrical signals representative of RGB image data and the signal processing member converts said electrical signals into YMC image data.

8. An image forming apparatus according to claim 1, wherein said image forming conditions comprise magnification information.

9. An image forming apparatus according to claim 1, wherein said image forming conditions comprise information discriminating said image as being either a photograph or a drawing picture.

10. An image forming apparatus which forms an input image on a paper sheet, the apparatus comprising:
    an operating panel to set parameters for forming a desired image, wherein said parameters are image forming conditions;
    signal processing means for converting input image data into desired image data in response to said parameters;
    outputting means for outputting an image containing said parameters on the paper sheet;
    controlling means for controlling said operating panel, said signal processing means and said outputting means;
    turning-over means for turning over the paper sheet; and
    detecting means for detecting whether a color image is included on a document;
    wherein said controlling means controls so as to turn over the paper sheet and form an image of image forming conditions on a back of said paper sheet and form an input image on a front of said paper sheet;
    wherein said controlling means controls so as to form (a) the input image on the front of said paper sheet and (b) the image of image forming conditions on the back of said paper sheet, only if said detecting means detects a color image on said document.

11. An image forming apparatus which forms an input image on a paper sheet, the apparatus comprising:
    an operating panel to set parameters for forming a desired image;
    signal processing means for converting input image data into desired image data in response to said parameters;
    outputting means for outputting an image containing said parameters on the paper sheet; and
    controlling means for controlling said operating panel, said signal processing means and said outputting means;
    wherein said controlling means includes:
    means for counting a copied number; and
    means for synthesizing (a) said copied number and (b) an input image, to form a synthesized image and for causing output of said synthesized image on the paper sheet.

12. An image forming apparatus which forms an input image on a paper sheet, the apparatus comprising:

an operating panel to set parameters for forming a desired image, wherein said parameters are image forming conditions;

signal processing means for converting input image data into desired image data in response to said parameters;

outputting means for outputting an image containing said parameters on the paper sheet;

controlling means for controlling said operating panel, said signal processing means and said outputting means; and an outside memory unit;

wherein said controlling means includes means for counting a copied number, and means for synthesizing (a) said copied number and (b) an input image, to form a synthesized image and for causing output of said synthesized image on the paper sheet;

wherein said copied number corresponds to image forming conditions which are at that time recorded in said outside memory unit, and said image forming conditions are read out from said outside memory unit when an operator indicates said copied number.

13. An image forming apparatus according to claim 12, wherein:

the apparatus further comprises a bar-code input member;

the signal processing means includes means for converting image forming conditions into a bar code; and the controlling means controls so that an image of said bar code is output on a sheet of paper.

14. An image forming apparatus which forms an input image on a paper sheet, the apparatus comprising:

an operating panel to set parameters for forming a desired image;

signal processing means for converting input image data into desired image data in response to said parameters;

outputting means for outputting an image containing said parameters on the paper sheet;

controlling means for controlling said operating panel, said signal processing means and said outputting means, said controlling means including a controller for sending control commands to said operating panel and said parameters to said signal processing means; and an image input member outputting electrical signals representative of said input image data in response to control commands sent from said controller; and wherein said signal processing means includes a signal processing member for receiving said control commands from said controller and said electrical signals from said image input member and outputting said input image data to said outputting means;

wherein the controller determines, upon detection of an indication of a copy start, whether parameters have been set by an operator and, if parameters have not been set by an operator, outputs initial predetermined values of said parameters to the signal processing member.

* * * * *